United States Patent [19]

Ahmed

[11] Patent Number: 5,455,938
[45] Date of Patent: Oct. 3, 1995

[54] NETWORK BASED MACHINE INSTRUCTION GENERATOR FOR DESIGN VERIFICATION

[76] Inventor: Sultan Ahmed, 560 Mill Creek La. #312, Santa Clara, Calif. 95054

[21] Appl. No.: 306,267

[22] Filed: Sep. 14, 1994

[51] Int. Cl.⁶ ............................. G06F 11/00; G01R 31/28
[52] U.S. Cl. ...................... 364/488; 371/27; 395/183.13
[58] Field of Search .................................... 371/15.1, 16.2, 371/19, 27, 23; 364/481, 488, 489, 490, 274.1, 274.2, 274.5, 275.6, 267, 267.91, 578; 395/575, 600

[56] References Cited

U.S. PATENT DOCUMENTS

| | | | |
|---|---|---|---|
| 4,012,625 | 3/1977 | Bowen et al. | 371/22.6 |
| 4,692,921 | 9/1987 | Dahbura et al. | 371/27 |
| 4,878,179 | 10/1989 | Larsen et al. | 364/490 |
| 5,027,353 | 6/1991 | Jarwala et al. | 371/27 |
| 5,036,474 | 7/1991 | Butts et al. | 364/489 |
| 5,168,563 | 12/1992 | Shenoy et al. | 364/488 |
| 5,202,889 | 4/1993 | Aharon et al. | 371/27 |
| 5,297,150 | 3/1994 | Clark | 371/19 |
| 5,323,400 | 6/1994 | Agarwal et al. | 371/22.3 |
| 5,371,747 | 12/1994 | Brooks et al. | 371/19 |
| 5,377,201 | 12/1994 | Chakradhar et al. | 371/27 |
| 5,379,231 | 1/1995 | Pillage et al. | 364/488 |
| 5,390,193 | 2/1995 | Millman et al. | 371/27 |

OTHER PUBLICATIONS

Direct Technology "Automator" Chapter 2, 3, 4, 5, 6 and 7 1991.

*Primary Examiner*—Robert W. Beausoliel, Jr.
*Assistant Examiner*—Albert Decady

[57] ABSTRACT

A machine instruction generator which generates a sequence of processor test instructions by traversing sites on a network, each of which has a local state corresponding to a group of related machine instructions. The sequence of processor instructions are generated by selecting a site on the network, randomly selecting a machine instruction available at that site by virtue of the local state, adding that machine instruction to a diagnostic file, and moving to an adjacent site. The sequence of machine instructions is concurrently tested on a functional model of the processor and a logical design of the processor. Any discrepancy in the results of these two tests indicates that a bug has been found in the processor. Network paths leading to the discovery of processor bugs may be represented in new generation networks produced by reinforcement learning or genetic operations.

21 Claims, 15 Drawing Sheets

NETWORK BASED MACHINE INSTRUCTION GENERATOR FOR DESIGN VERIFICATION

BACKGROUND OF THE INVENTION

The present invention relates to systems and methods for design verification of devices. More particularly, the present invention relates to smart instruction generators using network files to produce code for testing processors that may be used in computers or other processing machines.

During development, microprocessors must be exhaustively tested to identify design flaws. Ideally, the processor's performance is verified for all possible circumstances under which it might be operated in the real world. Unfortunately, this would involve testing a potentially infinite number of instruction sequences and therefore require a prohibitively long time to generate and run the test instructions.

To sample a wide range of possible instruction sequences for design verification, random instruction generators were developed. These systems simply generate a random sampling of instructions (typically in the processor's assembly language) which is then converted to machine code and executed on the processor or a logical representation of the processor. In related systems known as pseudo random test generators, the developer weights certain instructions or classes of instructions more heavily than others so that the random instruction are biased toward these desired instructions. These systems allow the developer to stress the microprocessor with certain types of instructions observed to cause difficulties (by weighting those instructions more heavily). For example, if a developer recognizes that instruction sequences having floating point operations identify a particularly high number of bugs, he or she may require that instructions for floating point operations be weighted more heavily. Although random and pseudo-random instruction generators can provide a wide range of possible instructions sequences with minimal user input, they do not intuitively understand which instruction sequences might be most difficult for the microprocessor to handle. Further, for some designs, such instructions may not test an adequately wide spectrum of instruction sequences. Thus, they sometimes fail to adequately test important aspects of a processor's functioning.

In an alternative approach known as a "directed diagnostic," a human programs a sequence of test instructions for verifying the processor design. In so doing, the programmer makes use of his knowledge of real world situations in which the processor might be expected to encounter difficulty. This allows the programmer to design tests which he or she expects to be difficult for the processor to successfully execute. Unfortunately, each user's experience is somewhat limited. Therefore, the test code likely will not sample a sufficiently large number of situations to adequately test the processor. Further, if the programmer was to attempt to write tests encompassing a sufficiently wide range of test cases, he or she would eventually spend a prohibitively long time developing the test code.

Thus, there exists a need for an instruction generator that can provide test instructions covering a wide spectrum of possible processor instruction sequences and can learn which instruction sequences are most likely to stress the microprocessor.

SUMMARY OF THE INVENTION

The present invention provides a machine instruction generator which generates a sequence of processor test instructions by traversing sites on a network, each of which has a local state corresponding to a group of related machine instructions. The sequence of processor instructions is generated by selecting a site on the network, randomly selecting a machine instruction available at that site (by virtue of the site's local state), adding that machine instruction to a diagnostic file, and moving to an adjacent site. This system generates an inherently wider spectrum of test sequences than the random and pseudo-random generators described above. When the diagnostic file produced from a network is complete, it is concurrently tested on a functional model of the processor and a logical design of the processor. Any discrepancy in the results of these two tests indicates that a bug has been found in the processor. Network paths leading to the discovery of such processor bugs may be represented in new generation networks produced by reinforcement learning or genetic operations.

In a preferred embodiment, the system of this invention includes (a) a compiler for preparing a network of sites each having a local state corresponding to one or more specified machine instructions and each interconnected to other sites by connections; and (b) a generator for producing a diagnostic file containing a sequence of machine instructions by moving from site-to-site via the connections on the network and at each site randomly selecting one of the instructions associated with that site's local state. Further, the overall testing system may include (c) an architectural model for running the sequence of machine instructions and providing the functional capabilities of the processor; (d) a processor design for running the sequence of machine instructions and providing the logical structure of the processor; and (e) a comparator for comparing results generated when the architectural model and processor design run the sequence of machine instructions, such that a bug in the processor is found when the results do not agree.

These and other features of the present invention will be presented in more detail in the following specification of the invention and the figures.

DESCRIPTION OF THE PREFERRED EMBODIMENTS

I. Physical Embodiment

The invention employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms, such as identifying, running, or comparing. In any of the operations described herein that form part of the present invention, these operations are machine operations. Useful machines for performing the operations of the present invention include general purpose digital computers or other similar devices. In all cases, there should be borne in mind the distinction between the method of operations in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given below.

Figure 1:
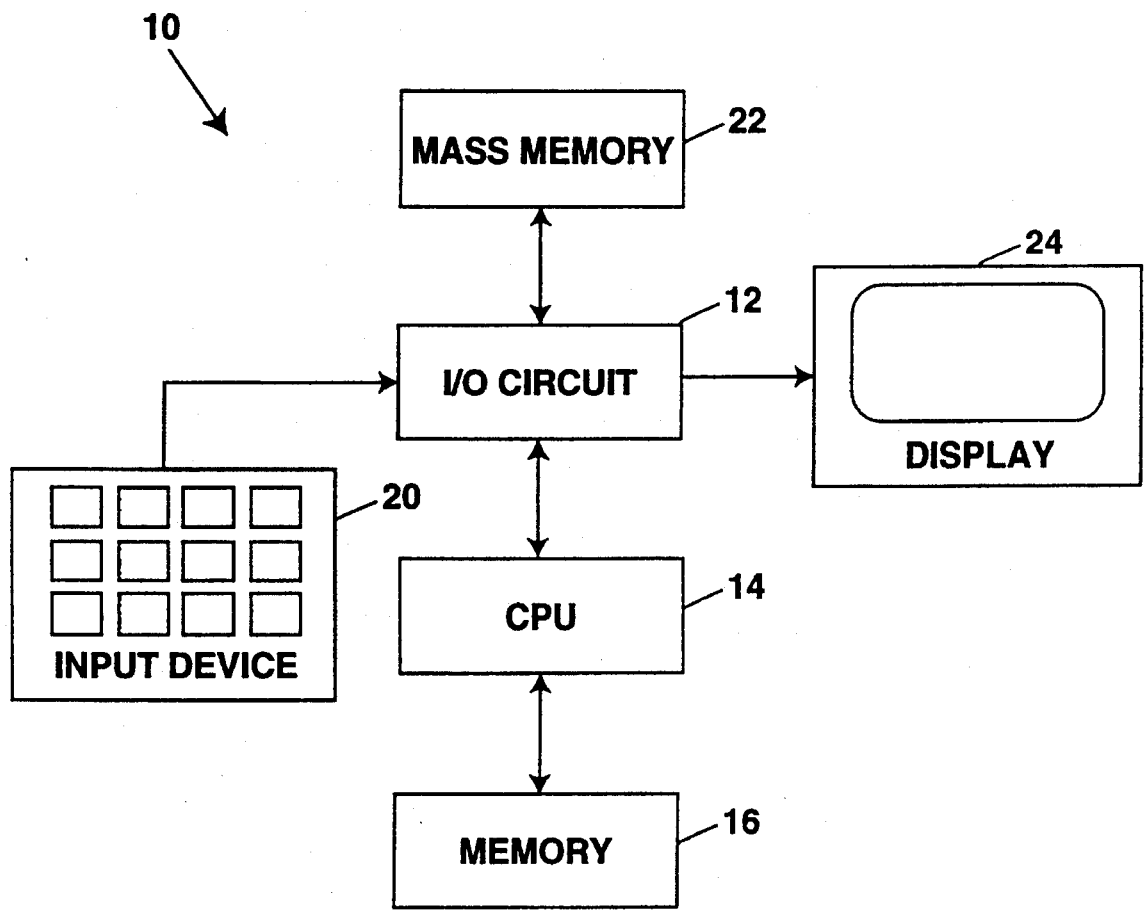
FIG. 1 is a block diagram of a computer system which may be used to generate and test diagnostic in accordance with this invention.

FIG. 1 shows a typical computer-based system according to the present invention. Shown is a computer 10 which comprises an input/output circuit 12 used to communicate information in appropriately structured form to and from the parts of computer 10 and associated equipment, a central processing unit 14, and a memory 16. These components are those typically found in most general and special purpose computers 10 and are intended to be representative of this broad category of data processors.

FIG. 1 also illustrates an input device 20 shown as a keyboard. It should be understood, however, that the input device 20 may actually be a transducer card reader, a magnetic or paper tape reader, a tablet and stylus, a voice or handwriting recognizer, or some other well-known input device such as, of course, another computer. A mass memory device 22 is coupled to the input/output circuit 12 and provides additional storage capability for the computer 10. The mass memory device 22 may be used to store programs, data and the like and may take the form of a magnetic or paper tape reader or some other well known device. It will be appreciated that the information retained within the mass memory device 22, may, in appropriate cases, be incorporated in standard fashion into computer 10 as part of the memory 16.

In additional, a display monitor 24 is illustrated which is used to display the images being generated by the present invention. Such a display monitor 24 may take the form of any of several well-known varieties of cathode ray tube displays or some other well known type of display.

As is well known, the memory 16 may store programs which represent a variety of sequences of instructions for execution by the central processing unit 14. For example, the test generator programs for providing the processor test instruction sequence may be stored within the memory 16.

II. Overview and Exemplary Operation of the System

The instruction generators of the present invention, as well as most conventional instruction generators, produce diagnostic files. A "diagnostic" or "diagnostic file" is a sequence of assembly language or machine instructions designed to identify bugs in a processor under development. Typically, the diagnostic is run on a software representation of the processor, but it can also, be run of an actual silicon processor.

As used herein, the term "processor" refers to any device that processes signals in a computational environment. For example, a microprocessor, a chip set, a mother board, and even a complete computer system with a CPU, memory, etc. constitutes a "processor" within the meaning of this invention. A processor may also be used as a controller for applications outside of the computer field, e.g., for automotive, environmental, and entertainment applications. Although processors from numerous vendors can be tested according to the methods of this invention, particularly appropriate processors are the SPARC microprocessors available from Sun Microsystems of Mountain View, Calif.

To determine whether a processor has bugs, a diagnostic is run on an "architectural model" and a "processor design model." The results of these runs are compared and, if there is a discrepancy, a bug has been found. The architectural model reproduces the functional behavior of a processor and acts as a control which provides the "correct" results. It emulates the architecture of the processor including pins, registers, caches, etc. However, an architectural model is only a functional representation, and does not contain the actual logic of the processor under development.

A "processor design" is the logical (Boolean) structural model of the processor being designed. It emulates the cycle-by-cycle (clock) behavior of the processor and includes a pipeline of instructions as found in the actual silicon processor. Processor design models are written in specialized, high level, detailed logical languages such as Veralog or VHDL. When the design of the processor is finalized (as determined by, for example, no further bugs being located), the code for the processor design model is converted to a silicon processor. The procedures involved in this transformation include creation of a net list, creation of a physical layout, and ultimately fabrication, all of which are standard processes well known to those of skill in the art.

Figure 2:
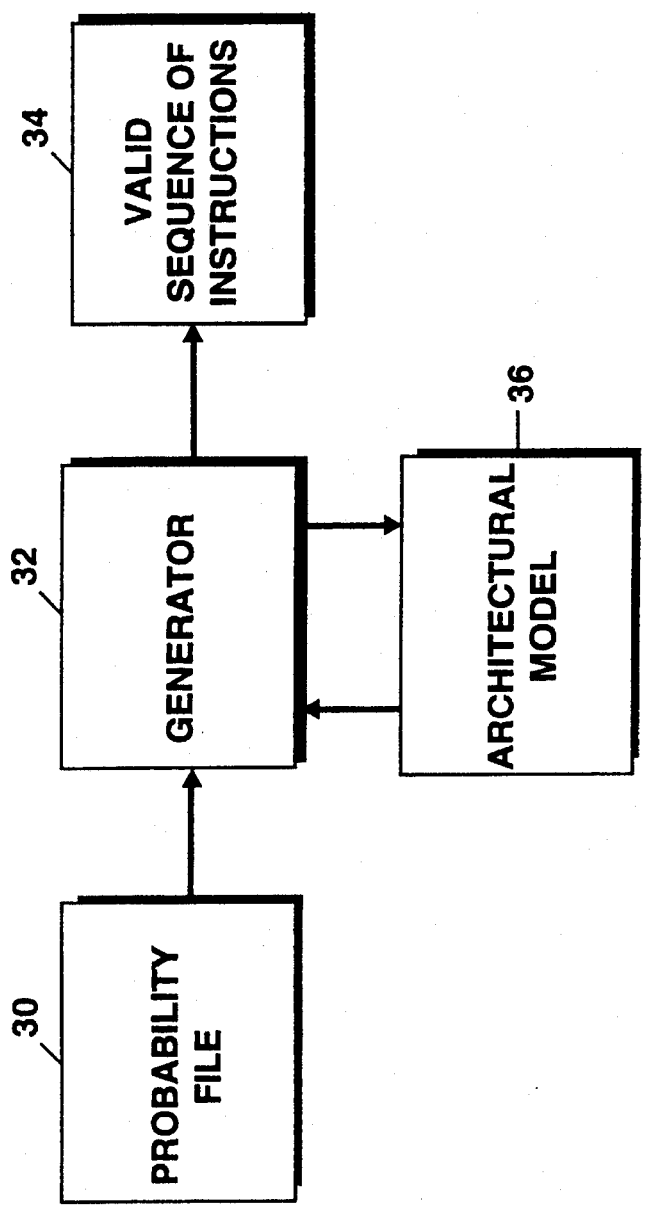
FIG. 2 is a block diagram of the system used in conventional random ore pseudo-random inspection generation.

FIG. 2 illustrates a conventional instruction generator. A probability file 30, which includes a list of machine instructions for a processor to be tested, is fed to a generator 32, which together with an architectural model 36 produces a valid sequence of instructions 34. Each instruction in probability file 30 is provided with an associated "weighting" representing the probability or frequency with which each instruction is selected for insertion into the sequence of instructions 34. The instructions in the probability file are randomly selected according these probabilities by the generator 32 to produce the valid sequence of instructions 34. If all available instructions are weighted equally in the probability file 30, each instruction will be represented equally in the sequence of instructions 34. However, if some instructions are to be weighted more heavily, those instructions will be represented with a greater frequency in sequence 34. For example, if floating point instructions are to be tested more heavy than other instructions, they will be given a greater weighting than the other instructions. Typically, the weighing associated with each instruction is provided by the user.

In conjunction with architectural model 36, generator 32 determines whether each sequence of instructions is valid. If it determines that a given sequence is invalid, it will reject one or more of the selected instructions and select a new one(s). The architectural model and generator determine whether an instruction sequence is valid by applying certain rules pertaining to the architecture of the processor under consideration. For example, if the processor contains three control registers, C1, C2, and C3, which must includes values having a defined relationship, the system will check the current values in each of the three control registers to insure that the required relationship is maintained.

Figure 3:
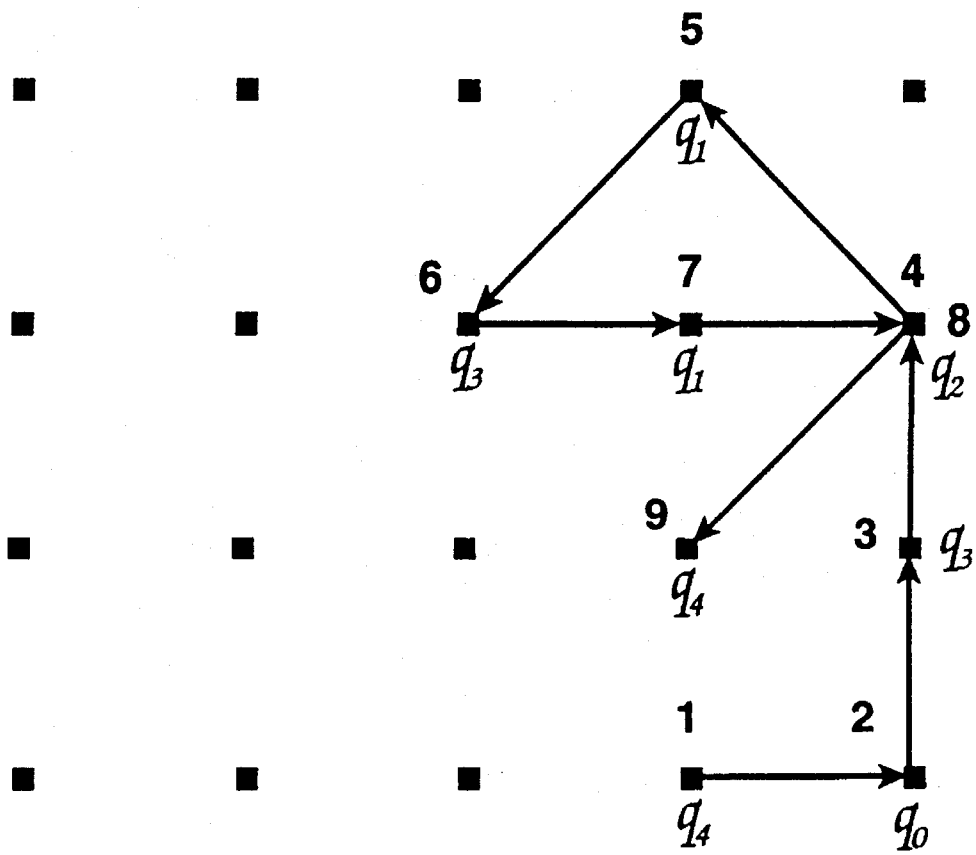
FIG. 3 is a representation of a network and path through various sites in that network which rarity be used to generate an instruction sequence in accordance with this invention.
Figure 4A:
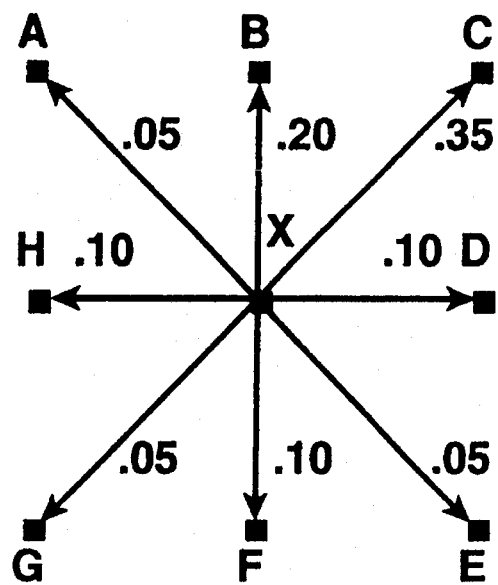
FIG. 4a is a representation of a site X and the connections that site has with neighboring sites.
Figure 4B:
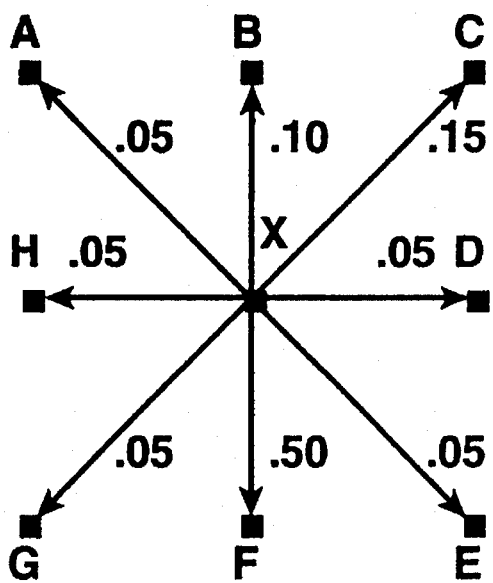
FIG. 4b is another representation of site X, but having reweighted connections based on reinforcement learning.

The following example illustrates how the present invention uses a "network" (as opposed to a probability file of the prior art) to generate a diagnostic program. In this example, the weighted probability file shown in FIG. 2 is replaced by a network file containing information such as that shown in FIG. 3. The network includes a series of "sites" shown as small squares connected by "connections" or "arcs" shown as arrows between neighboring sites. FIGS. 4a and 4b illustrate the connections available to a site "X" which is depicted as a central square. To generate an instruction file, the generator 32 starts at an initial point, the site designated "1," and there derives a first processor instruction for the diagnostic file. It does this by randomly selecting one instruction from a collection of available instructions at the initial site, and inserting the selected instruction in first available location in the diagnostic file. Each site has a "local state" indicated by the "q" numbers shown in FIG. 3. Each such q state ($q_0$–$q_4$ are available in this example) represents a subset of the total available processor machine instructions. For example $q_0$ might represent load/store operations, $q_1$ might represent floating point operations, $q_2$ might represent graphical operations, etc. In this example, assume that the state of site 1, $q_4$, includes add, subtract, operations. Further, assume that the generator randomly selects "subtract" as the first microprocessor diagnostic instruction. At this point, the generator must also select the values to be used in the subtraction operation. It does this by picking random numbers. The generator must also randomly select a register in which the result of the subtraction operation is stored. Limits on the values and registers used in performing such instructions are set forth in a "state file" associated with the network. For example, the values used in the subtraction operation may be limited to values between –4000 and 4000.

After the processor instruction from the initial site is added to the diagnostic file, the generator randomly selects a connection from the first site and moves to a destination site ("2") on that connection and adjacent to the initial site. This second site is in local state $q_0$ which represents a collection of load and store operations. One such operation is randomly selected together with the appropriate fields (e.g., the register(s) used in the operation) from the state file. The instruction for site 2 is then added to the diagnostic file at next available location. Because the parameters (fields) delimited in the state file apply to all sites, these parameters are deemed "global states," while the specific "q" states associated with the individual sites are deemed "local states".

After the second instruction (from the second site) is added to the diagnostic file, the generator randomly selects the connection to site 3, which is in local state "$q_3$." An appropriate instruction is then randomly selected and added to the diagnostic file. The generator then moves through the network to a fourth site (state $q_2$), a fifth site ($q_1$), a sixth site ($q_3$), a seventh site ($q_1$), an eighth site (identical to the fourth site), and a ninth site ($q_4$). This process continues until all available slots in the diagnostic file have been filled with assembly language instructions. In the end, this approach of randomly moving through a network to generate test instructions for a diagnostic file inherently provides a wider spectrum of test sequences than approaches using conventional weighted probably files.

A further advantage of network based systems is their ability to generate new paths (and consequently new diagnostic instruction sequences) based upon information they have learned from previous test runs. For example, if several diagnostic files are generated from a single network (through multiple randomly selected network paths) and one of these produces a bug while the other do not, the network path uncovering the bug can be reinforced while the others are discarded.

The mechanism of reinforcing a path is illustrated in FIGS. 4a and 4b. FIG. 4a shows an example of the connections available between a hypothetical site X and its "neighborhood" of adjacent sites. Each such connection has an associated weighting. If all connections are equally likely to be selected, each will have an equal weighting. In the example shown in FIG. 4a, some connections are weighted more heavily than others, and therefore are likely to be selected. For example, the connection between sites X and C is seven times more likely to be selected than the connection between sites X and G. Further, the path from site X to site B is given a normalized weighting of 0.20. Thus, 20% of the direct routes from site X will go to site B. Similarly, 10% of the routes from site X will go to site F.

Now, assume that site X is included in a path that uncovers a bug. Initially, the connections to the eight sites surrounding site X (i.e., sites A–H) are weighted as shown in FIG. 4a. Assume further that a bug is found in a sequence of instruction generated from a path that includes the connection from site X to site F. To reinforce this path, and thereby explore other instruction sequences that might uncover additional related bugs, the weightings of the connections surrounding site X are revised. In this example, the revised weightings are shown in FIG. 4b. As shown, the path from site X to site F has been reinforced so that it now has a 50% chance of being selected (i.e., its normalized weighting is 0.50). The other connections to site X have had their weightings reduced by comparison. Thus, as new diagnostic sequences are generated, they are more likely to include the path from site X to site F. Other connections from the sequence that uncovered the bug will likewise be reinforced.

Figure 5:
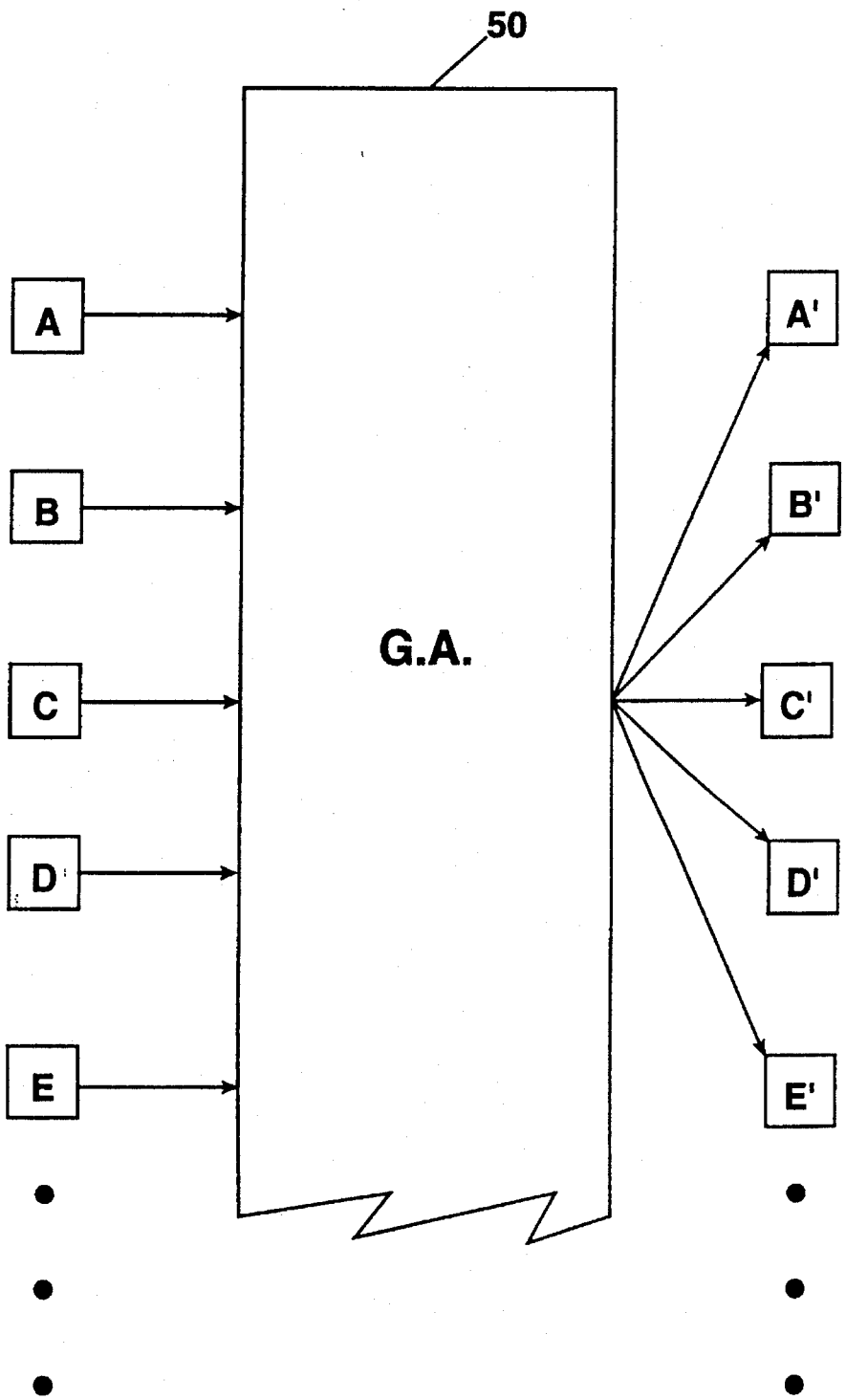
FIG. 5 is a block diagram depicting the process by which a genetic operator converts a first generation of networks into a second generation of networks.

In an alterative method of reinforcing a path, a population of networks is tested and reproduced through a genetic algorithm such as cross-over or mutation. In this approach, a first generation of networks is replaced a second generation of networks which contain only those elements of first generation that uncovered bugs. For example, if 100 different networks are used to generate diagnostic files and only five of those files find bugs, the networks corresponding to those that found bugs will be reproduced in a new generation of networks. This process is represented graphically in FIG. 5 where the first generation of networks (A, B, C, D, E, . . . ) are combined by a genetic algorithm 50 to produce a new generation of networks (A', B', C', D', E,'. . . ).

Details of the genetic operations will be described below. Briefly, the networks which do not produce diagnostic files uncovering a bug are not reproduced in the next generation. Those networks which do lead to bugs are dissected to extract clusters of sites which made up the sequences leading to bugs. Each of those clusters is then used as building block for the next generation of networks. The clusters are rearranging by cross-over and mutation operations to build up new networks which hopefully will have a good chance of finding new bugs.

III. Testing Sequence

Figure 6:
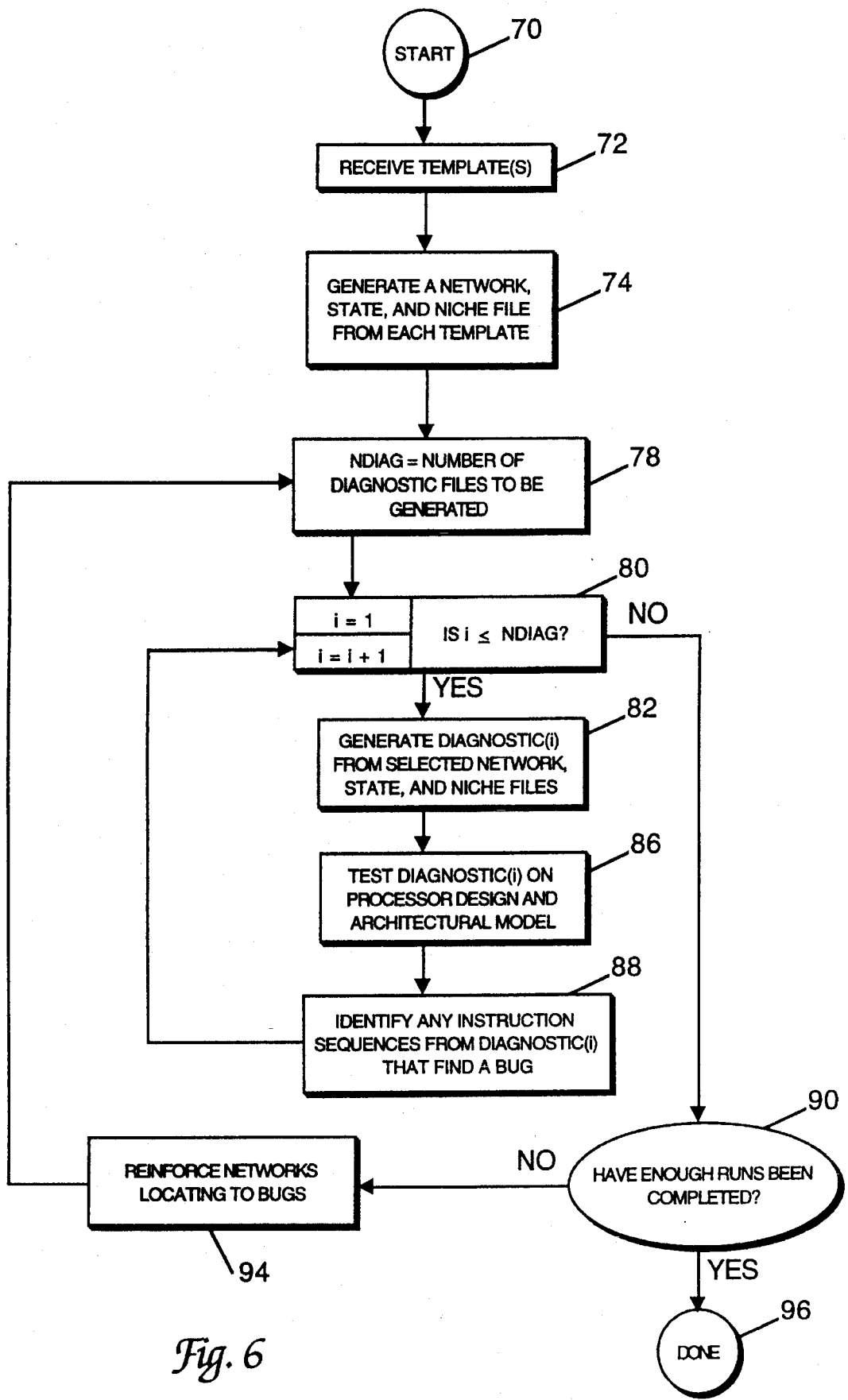
FIG. 6 is a process flow diagram depicting the overall process of preparing and running diagnostic files in accordance with this invention.

An overview of the process by which diagnostic files are generated and modified in accordance with the present invention is presented in FIG. 6. The process begins 70 and in a step 72, the system receives one or more templates, each of which includes the various parameters used in describing the networks which will be subsequently generated. The templates, which are written in a computer language, are compiled to generate files necessary to define the network, its global and local states, and the file for holding the diagnostic. In a preferred embodiment of this invention, network, state and niche files are generated from each template at a step 74. The niche file is simply an incomplete diagnostic file containing set-up and other appropriate instructions at the beginning and end of the file. The intermediate part of the niche file is left available for insertion of test instructions generated by generator 32. The state file contains the necessary global states for the network, and the network file defines the arrangement of sites in network.

After the appropriate files have been generated at step 74, a step 78 sets a variable NDIAG equal to the number of diagnostic files to be generated. It should be noted that one or more diagnostic files may be generated from each separate network. Because the diagnostic generation process contains many random steps, each diagnostic file generated from a given network will likely be different. In practice, multiple diagnostics are generated to sample a potentially wide range of possible instruction sequences.

After the value of NDIAG as been set, an iterative loop step 80 sets a diagnostic counter "i") equal to 1 and then determines whether the current value of i is less than or equal to NDIAG. Assuming that i is, in fact, less than or equal to NDIAG, a process step 82 thereafter generates a complete diagnostic file from the current template's network, state, and niche files. This process will be described in more detail below. After the diagnostic has been generated, a step 86 executes the diagnostic file on both an architectural model of the processor and a processor design model. Any discrepancies between the results obtained by these two models are caused by bugs in the processor design, and the instruction sequence in the processor pipeline when the discrepancy occurs is noted at step 88. Thereafter, process control returns to iterative loop step 80 where the value of i is incremented by 1 and again checked against the value NDIAG. Assuming that the value of i is still less than or equal to NDIAG, the next diagnostic file (i) is generated from the selected network, state, and niche files. These files may or not may be the same as those used to generate previous diagnostic file(s).

When the number of diagnostic files generated and executed in steps 82, 86, and 88 surpasses the value of NDIAG, iterative loop step 80 directs the process to step 90 where the system determines whether enough testing has been performed. If so, the process is completed at 96. If not, a step 94 uses the information it has learned about the processor bugs to reinforce those networks paths leading the bugs. Typically, new templates will be generated at this point. Thereafter, process control returns to step 78 where the variable NDIAG is reset to the number of diagnostic files to be generated in the new run. Two suitable techniques for reinforcing network paths are (1) reinforcement learning, (2) genetic algorithms, both of which will be discussed below.

Figure 7:
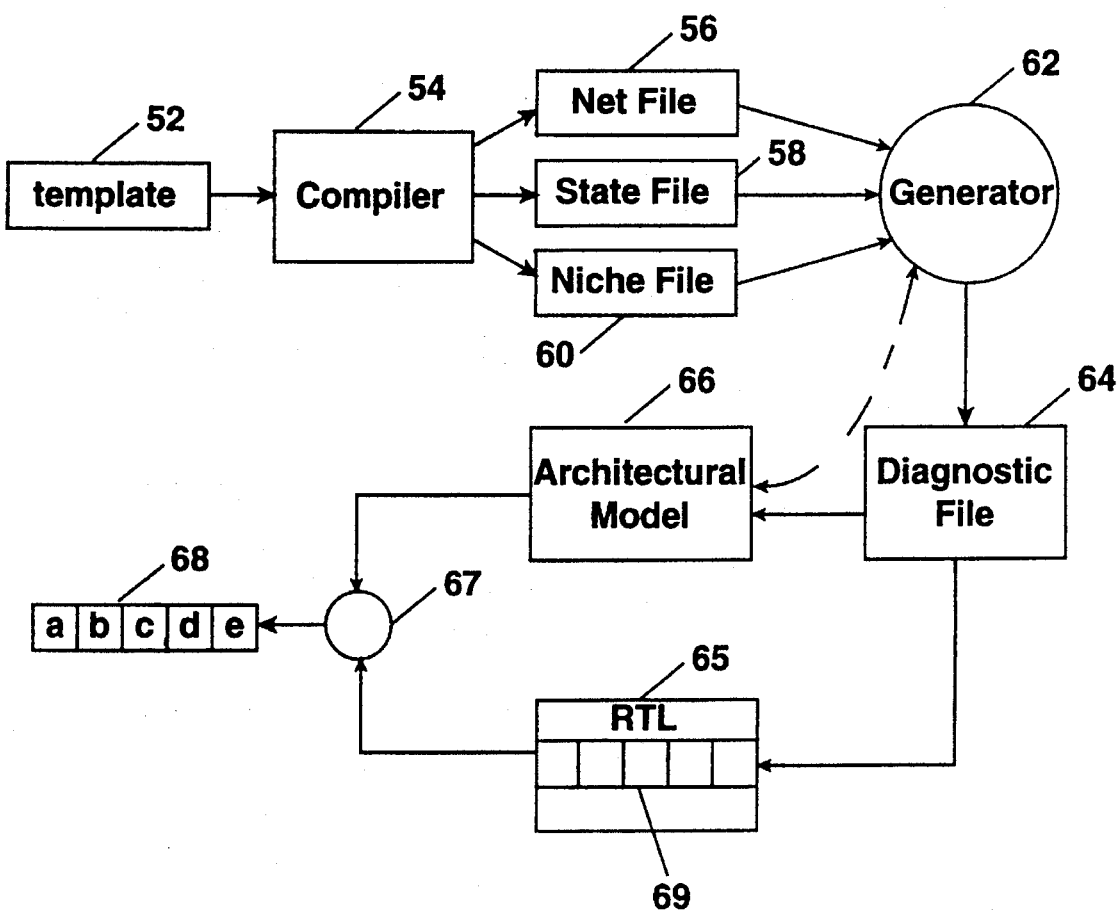
FIG. 7 is a block diagram illustrating the important entities used to identify processor bugs in accordance with this invention.

The process or generating and running a diagnostic file is illustrated schematically in FIG. 7. The template file 52 is complied by a compiler 54 to yield three files: a net file 56, a state file 58, and niche file 60. These are then used by a generator 62 in conjunction with an architectural model 66 to produce a diagnostic file 64 which is subsequently executed on architectural model 66 and a processor design 65. As shown, processor design 65 includes a pipeline 69, representing the sequence of instructions currently being handled by the processor. The results obtained from running diagnostic file 64 on architectural model 66 and processor design 65 are compared by a comparator 67. If a discrepancy is found in the results, it is assumed that the processor design has a bug. When this occurs, a sequence of instructions 68 currently in pipeline 69 is noted.

The net file 56 contains a list of all sites in the network. A 7×7×7 network, for example, would have 343 entries, each of which identifies the local state and connections associated with a particular site. Each connection has an associated weighting. As mentioned, the niche file 60 is an incomplete diagnostic file which accepts randomly generated instructions from the network file 56.

The state file 58 includes the global information required to fill in fields associated with various diagnostic instructions. In addition, the state file 58 includes a list of the local states ("q") available to all sites of the network. The global states in a state file may include one more of the following: a list of the available local states for the network sites, a histogram of branch offsets, a loop control option, a range of immediate load/store values, a list of pipeline bypass control parameters, an alternate space identifier, and a self-modifying option.

Each local state defined in the state file specifies a subset of instructions available to the microprocessor. The subsets may be mutually exclusive or may include some overlap.

Further, the subsets may have different numbers of members. Generally, but not always, the members of a local state are related instructions. For example, one state may include instructions for graphical operations, another state may include instructions for load/store operations, another state may include instructions for floating point operations, etc. When a network file is being prepared by generator 62, each site is assigned its own local state.

Loop control and self-modifying options may be set to either "on" or "off" in the state file. Loop control allows the diagnostic file test instructions to control its loops internally. Self-modification allows the test instruction sequence to change its own code.

A histogram of branch offsets provides an offset size and an associated frequency. During generation of the diagnostic file, the generator 62 randomly assigns branches to the diagnostic code. The size or offset (number of instructions in the branch) of the these branches is randomly selected. However, the user may desire that offsets of certain sizes be used more frequently than offsets of other sizes. The histogram allows such control by weighting the various offset sizes. For example, branches with offsets of 1–64 instructions might have a frequency of 40%, while offsets of 65–220 instructions might have a frequency of 35%, and offsets of 221–500 instructions might have a frequency of 25%.

The range of load/store immediate values parameter specifies the available values (e.g., –4000 to 4000) that can be randomly selected for load or store operations. The pipeline bypass control parameters specify the closest and farthest source and destination within a processor pipeline for bypass operations. Finally, the alternate space identifiers allow control over access to a processor's cache.

The process by which generator 62 generates diagnostic instructions from a network (i.e., step 82 of FIG. 6) will now be described with reference to FIG. 8. The process begins at 100 and then a step 102 sets the current site (i.e., the network site at which an instruction is to be chosen) equal to the initial site. Generally, the initial site will have been randomly determined previously when the template was compiled. Of course, the initial site could be determined by other methods such as having the developer pick a site or specifying a particular corner site in every ran.

As noted, each site in the network will have a local site which specifies a subset of processor instructions. After the initial site is determined at step 102, an instruction is randomly chosen from those available in the local state of the initial site at step 104. Next, any fields or parameters required to complete the selected instruction are chosen in a processor step 108. As indicated above, these are chosen from the global states provided in the state file associated with the current network file.

After all necessary fields are supplied for an instruction, a decision step 110 determines whether the current instruction or sequence of instructions is valid. A valid instruction is one that meets certain rules imposed on the processor under development. For example, if it is required that the values stored in certain control registers have a defined relationship, an instruction which violates that relationship will be invalid. In practice, during this validity check, generator 62 checks with architectural model 66 to determine whether a defined relationship has been violated. If so, step 110 is answered in the negative.

Assuming, however, that step 110 is answered in the affirmative, a process step 112 adds the current instruction to the next available space in the niche file. As indicated, a niche file is a partially completed diagnostic file containing code necessary to setup the computer to run the randomly generated diagnostic instructions. Each time step 112 is repeated, the niche file gains another random instruction until a completed diagnostic file has been produced. After a selected instruction has been added to the niche file, a decision step 116 determines whether the desired number of processor instructions have been added. Typically, the user will select this number. If decision step 116 determines that more instructions are required, a process step 118 selects the next connection from the current site. As explained in the discussion of FIG. 4a, each site has a plurality of neighboring sites with which it is connected by connections. Each of these connections may have an equal likelihood of being selected. However, each connection preferably has a unique weighting, so that some connections are more likely to be selected than others. In any event, after the connection has been selected, a process step 120 sets the current site equal to the connection destination. Thereafter, process control returns to step 104 where the next instruction for the diagnostic file is randomly selected from those available at the current site.

Figure 8:
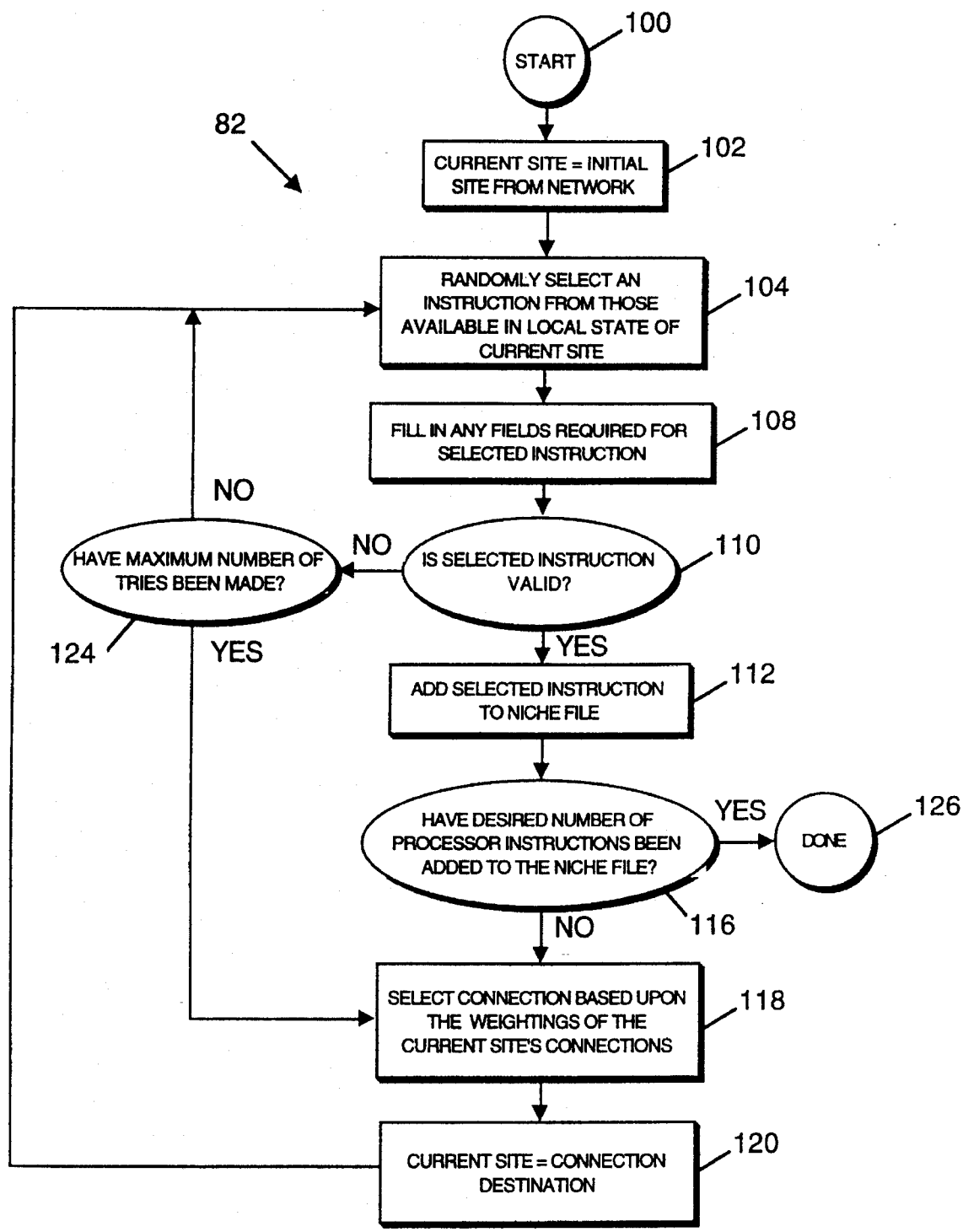
FIG. 8 is a process flow diagram detailing the process by which an instruction sequence is generated from a network.

In the above description of FIG. 8, it was assumed that decision step 110 determined that the selected instruction was a valid instruction. However, if decision step 110 determines that the instruction is not valid, a subsequent decision step 124 determines whether the maximum number of attempts to locate a valid instruction have been made. That is, if repeated random selections of instructions at the current site fail to yield a valid instruction, decision step 124 is answered in the affirmative. Preferably, the maximum number of tries used in this process is 5. Assuming that decision step 124 is answered in the affirmative, process control jumps to step 118 where another site is chosen and designated as the current site. Hopefully, a valid instruction will be provided at this new site. If decision step 124 is answered in the negative (i.e., a sufficient number of tries have not been made at the current site), process control returns to step 104 where another instruction is randomly selected at the current site.

IV. Learning Methods

Figure 9:
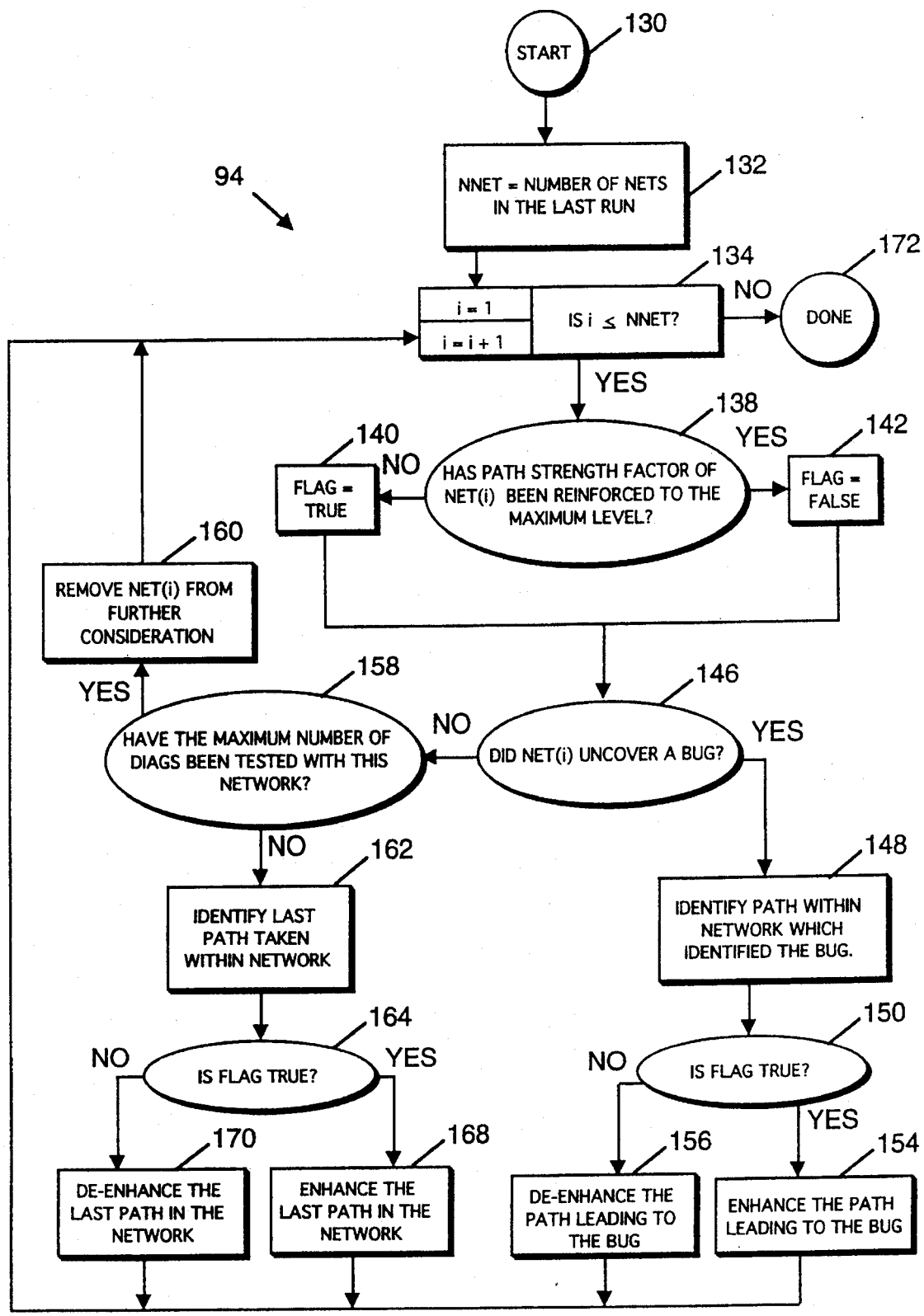
FIG. 9 is a process flow diagram detailing the application of reinforcement learning to the networks of this invention.
Figure 10:
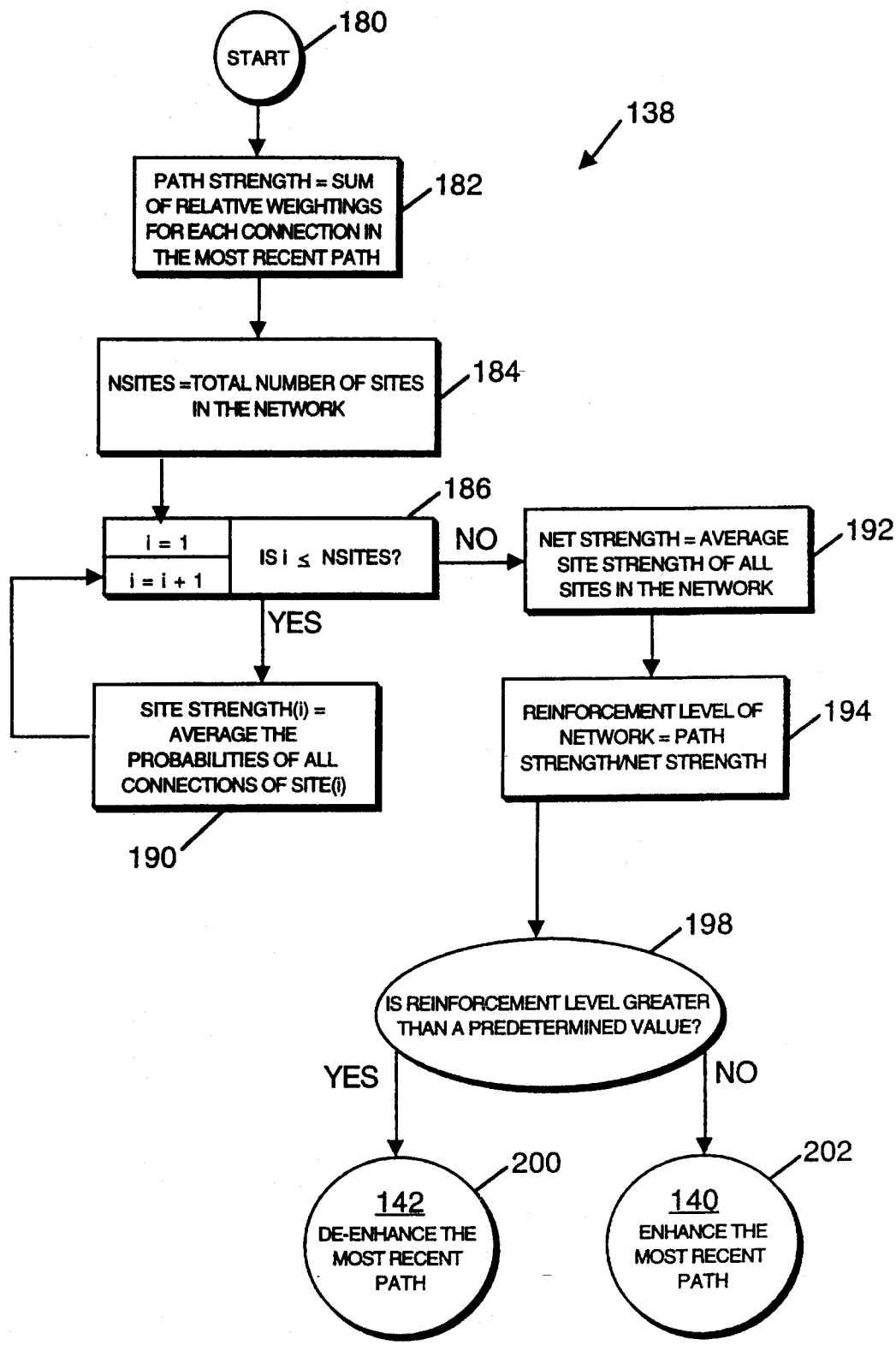
FIG. 10 is a process flow diagram depicting one mechanism for determining whether to enhance or de-enhance network paths in reinforcement learning.

As noted above, there are two types learning methods that are particularly preferred in this invention: reinforced learning and genetic algorithms. FIGS. 9 and 10 detail the reinforcement learning procedure and FIGS. 11–14 detail the genetic algorithm procedure. In the larger context of this invention, both of these procedures may correspond to step 94 of FIG. 6.

The reinforcement learning method depicted in FIG. 9. The process begins at 130 and in a step 132, the variable "NNETS" is set equal to the number of networks used to generate diagnostic files in the current run. The term "run" as used in this context refers to one or more diagnostic tests conducted on a current version of the processor design. Each such run typically employs a single network and multiple diagnostics generated therefrom. The results of each run are employed in the learning algorithm.

After the value of NNETS has been set in step 132, and iterative loop step 134 sets the value of a net counter i equal to 1 and also determines whether the current value of i is less than or equal to the value of NNET. If so, a decision step 138 calculates a "path strength factor" for NNET (i) and determines whether the value of that factor has exceeded a predefined maximum level. This test is intended to determine whether a particular network has been so refined that it is unlikely to adequately explore alternative potential paths to bugs. When this maximum level of reinforcement is found (i.e., decision step 138 is answered in the affirmative), a flag is set to FALSE at a step 142. When, on the other hand, decision 138 is answered in the negative, a process step 140 sets the flag to TRUE.

After the flag has been set in either step 140 or 142, a decision step 146 determines whether the diagnostic file generated from the current network (NNET (i)) found any bugs in the processor design. If so, a step 148 identifies the network path that generated the instructions which uncovered the bug. Thereafter, a decision step 150 determines whether the flag is set to TRUE. If so, the path to the bug is reinforced (enhanced) at step 154. Generally, as described above in connection with FIGS. 4a and 4b, a path is enhanced by increasing the probably that the connections between sites on the path will be selected in generating the next diagnostic file. In a preferred embodiment, the bug path connections are given a 50% probability of being selected in the next generation of diagnostic files. Of course, higher or lower weightings may be appropriate depending upon how rapidly focused the network is to become. After the path has been enhanced at step 154, the process control returns to iterative loop step 134 where the network counter i is incremented by 1.

If decision step 150 is answered in the negative (i.e., the flag is set to FALSE), a step 156 de-enhances the path leading to the bug. That is, the weightings associated with the connections making up the path are reduced. Preferably, the probabilities of the connections are reduced by 25%. Thereafter, process control is returned to iterative loop step 134 where counter i is incremented by 1. Networks having paths that are enhanced or de-enhanced (in steps 154 or 156) are, of course, used in the next run (i.e., they are used to generate the next generation of diagnostic files).

If decision step 146 determines that the network under consideration (network (i)) failed to uncover a bug, a decision step 158 determines whether a maximum number of diagnostic files have been tested for this network. If so, a process step 160 removes the network from further consideration and process control returns to iterative loop step 134. In other words, the network is not used to generate the next generation of diagnostic files because it has shown no evidence of finding a bug. Preferably, the maximum number of diagnostics tested (without success) for a given network will be 10.

Assuming that decision step 158 is answered in the negative, a process step 162 identifies the most recent path taken within the network to generate a diagnostic file. Thereafter, a decision step 164 determines whether the flag is currently set to TRUE. If so, the most recent path is enhanced as described in connection with step 154. If, however, the flag is set to false, a step 170 de-enhances the last path as described in connection with step 156. Regardless of whether the most recent path is enhanced or de-enhanced, process control returns to iterative loop step 134 where the value of counter i is incremented by 1.

A preferred process for determining whether the network has been enhanced to the level where the path strength factor exceeds a maximum level (step 138 of FIG. 9) is detailed in FIG. 10. The process begins at 180 and then a step 182 determines the "path strength" by averaging the relative weights for each connection in the most recent path taken within the network. Thereafter, a step 184 sets a variable NSITES equal to the total of number of sites within the network. Next, an iterative loop step 186 initializes a site counter i equal to 1 and then determines whether the current value of i is less than or equal the value of NSITES. If so, a step 190 sets the value of "site strength" for the current site equal to the average probability of that each of site's connections. Thereafter, the process control returns to iterative loop step 180 where the counter i is incremented by 1. This process of looping between steps 186 and 190 continues until all sites in the network are treated. Thereafter, iterative loop step 186 determines that the value of i is no longer less than equal to the NSITES and process control is directed to step 192 where the value of "net strength" is determined. The net strength is simply the site strength averaged over all sites within the network. It should be noted that if the connection weightings of a given site are normalized (i.e., their sum is always 1 or some other constant value), the value of net strength will be invariant for a given network. This is because the average value of all weightings associated with a given site will not change, even as paths are reinforced. In this case, steps 184, 186, 190, and 192 will be unnecessary.

After the net strength has been calculated in step 192, a step 194 determines the reinforcement level of the network. This is the value of the path strength divided by the net strength. A decision step 198 then determines whether this reinforcement level is greater than a predetermined value. That predetermined value may be chosen by the user. In a preferred embodiment, the value is about 0.3. If decision step 198 is answered in the negative, the process is concluded at step 202 which corresponds to step 140 FIG. 9. If, on the other hand, decision step 198 is answered in the affirmative, the process is completed at step 200 which corresponds to step 142 of FIG. 9. Put another way, step 202 indicates that a decision has been made to enhance the most recent path of the current network, while step 200 indicates a decision to de-enhance the most recent path in the current network.

A suitable genetic algorithm for use with this invention will now be described with reference to FIG. 11. As with the reinforcement learning process depicted in FIG. 9, the process of FIG. 11 corresponds to step 94 of FIG. 6. The process begins at 204 and in a step 206 the variable NTEM is set equal to the number of templates in the current generation. After the value of NTEM has been set, an iterative loop step 208 initializes a template counter (i) to 1 and compares the current value of the counter to NTEM. If i is smaller than NTEM, a step 210 creates a "rule file" for template (i). Initially, the rule file contains no entries, but eventually it will be filled with clusters of network sites as described below.

After the rule file has been opened, a step 214 sets the variable NNT equal to the number of networks generated from template (i). As explained below, each template will typically be used to generate a plurality of networks, each of which is capable of locating a bug in the processor design. After the value of NNT has been set, an iterative loop step 216 initializes a network counter (j) to 1 and checks the current value of j against the value of NNT. Assuming that j is less than or equal to the value of NNT, a process step 218 creates a "bug file" for network (j). This process will be described in more detail below with respect to FIG. 12. After the bug file has been created, a step 220 derives a cluster of network sites from the information contained in the bug file for network (j). The cluster of points is then added to the current rule file for template (i). Thereafter, process control returns to iterative loop step 216 where the value of j is incremented by 1. The value of j is then compared with NNT, and if it less than or equal to NNT, a bug file is created for the new network at step 218. The process continues in this manner until all networks for template (i) have been processed according to steps 218 and 220. After the last such network has been considered, iterative loop step 216 directs process control to step 222 where the "fitness" of template (i) is determined. This parameter will be discussed in more below. After process step 222 has been performed, process control returns to iterative loop step 208 where the counter i is incremented by 1 so that the next template can be processed.

After all templates in the current generation have been processed as described, iterative loop step 208 directs process control to step 226 where the genetic operations of mutation, reproduction, and cross-over are performed on the rule files prepared for the templates. It should be noted, that the fitness parameter determined in step 222 provides a weighting for the various rule files used in the genetic operations. After the appropriate genetic operations have been completed in step 226, a step 228 produces the next generation of templates and associated net files. The process is then completed at 230.

Figure 11:
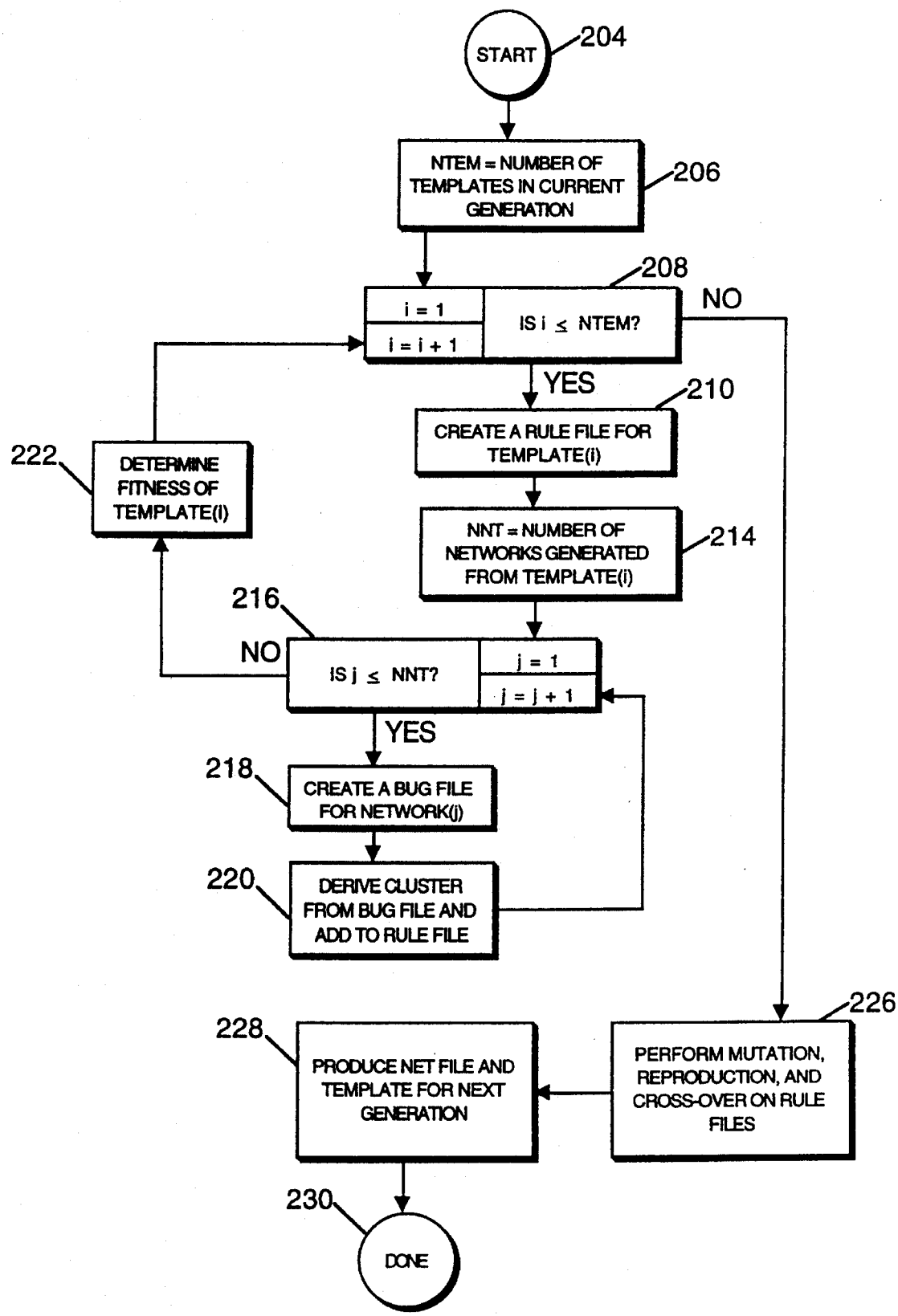
FIG. 11 is a process flow diagram presenting the important steps in a genetic algorithm used to convert a first generation of networks to a second generation of networks.
Figure 12:
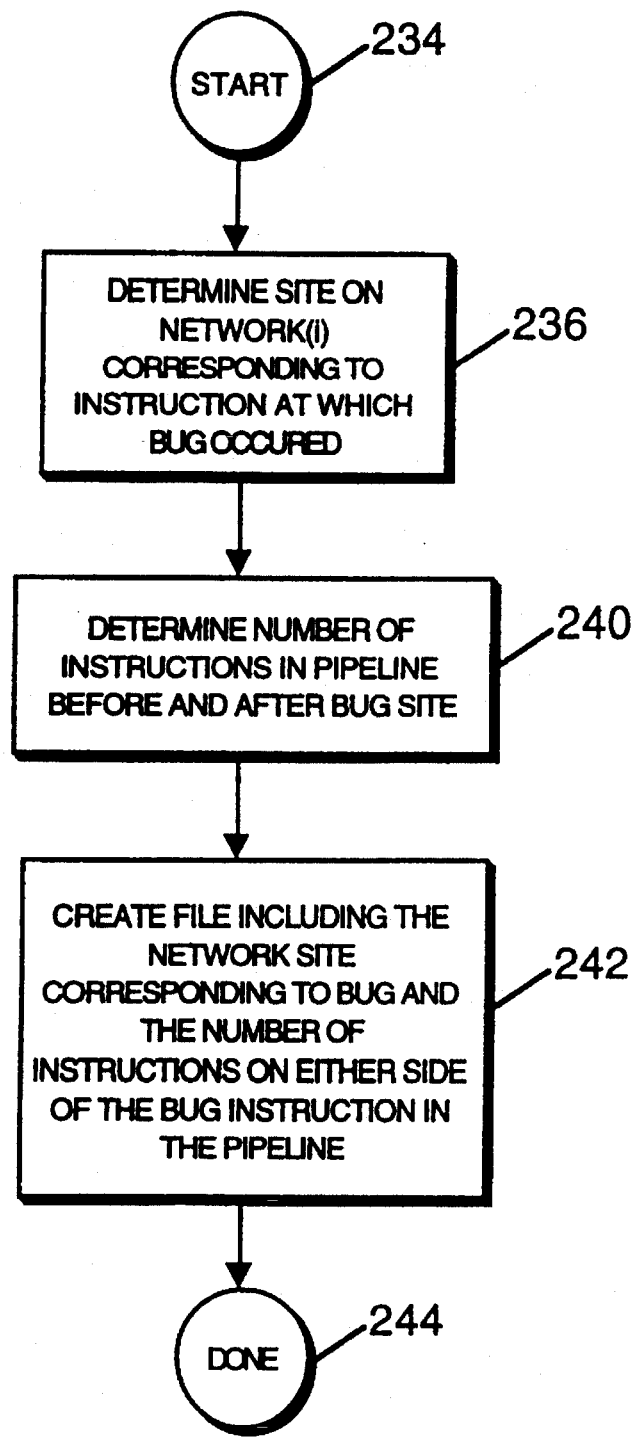
FIG. 12 is process flow diagram depicting the process by which a bug file is produced for use in the above-described genetic operations.

The process of preparing a bug file (step 218 of FIG. 11) is detailed in FIG. 12. The process begins at 234 and a step 236 thereafter determines which site on network (i) corresponds to the instruction which located a bug in the processor design. As explained above, the diagnostic instruction sequences which locate bugs are generated from paths traversed on a given network. After the network site has been determined in step 236, a step 240 determines the number of instructions in the processor pipeline at the time when the bug was located. Specifically, the number of pipeline instructions before and after the bug site are determined. Next, a step 242 creates the bug file and includes the network site corresponding to the instruction at which the bug was identified as well as the number of pipeline instructions identified in step 240. The process is then completed 244. Thus, the bug file simply contains a network site associated with the bug and the number of instructions within the pipeline before and after the bug instruction.

As noted, the fitness parameter determined at step 222 of FIG. 11 provides a weighting for the various rules files. Generally, rules files associated with templates uncovering many bugs or bugs of particular interest should be given a higher fitness value. In some cases, the user may know ahead of time that particular templates are likely to produce interesting results. Rule files for such templates can be given high fitness values by the user. Of course, the system can provide it own fitness values based on appropriate system criteria such as the number or severity of the bugs uncovered by a particular template.

Figure 13A:
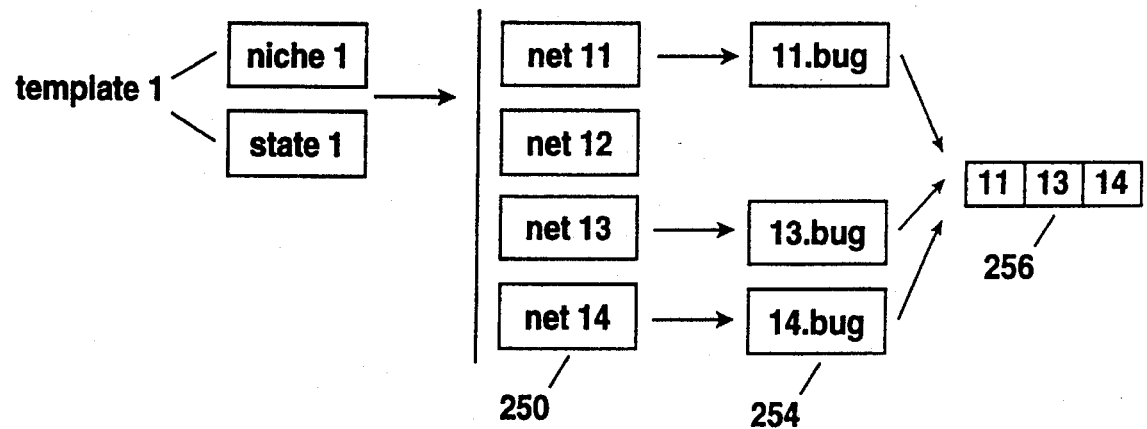
FIG. 13a is a block diagram illustrating how template files are converted to rule files for use in the genetic operations of this invention.
Figure 13A:
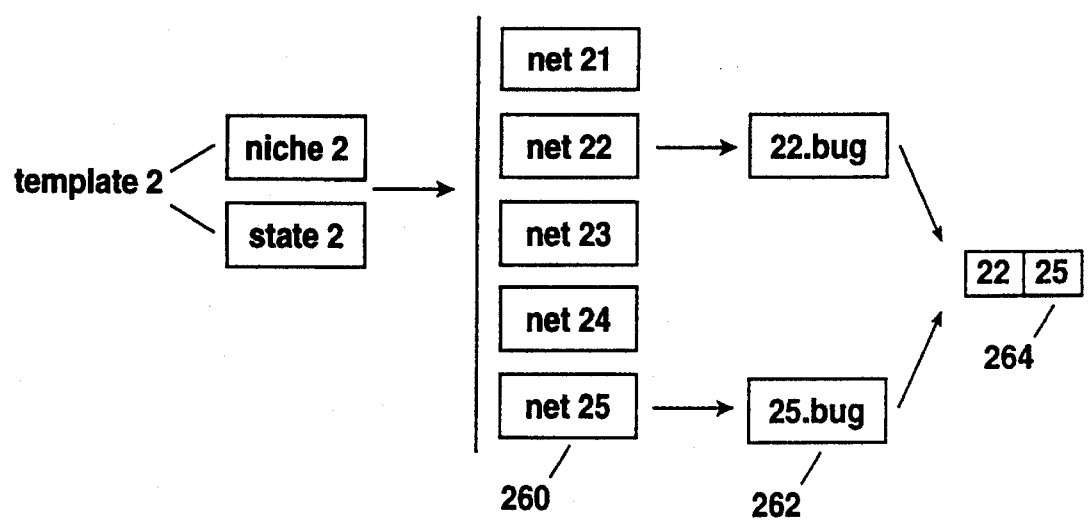
Figure 13B:
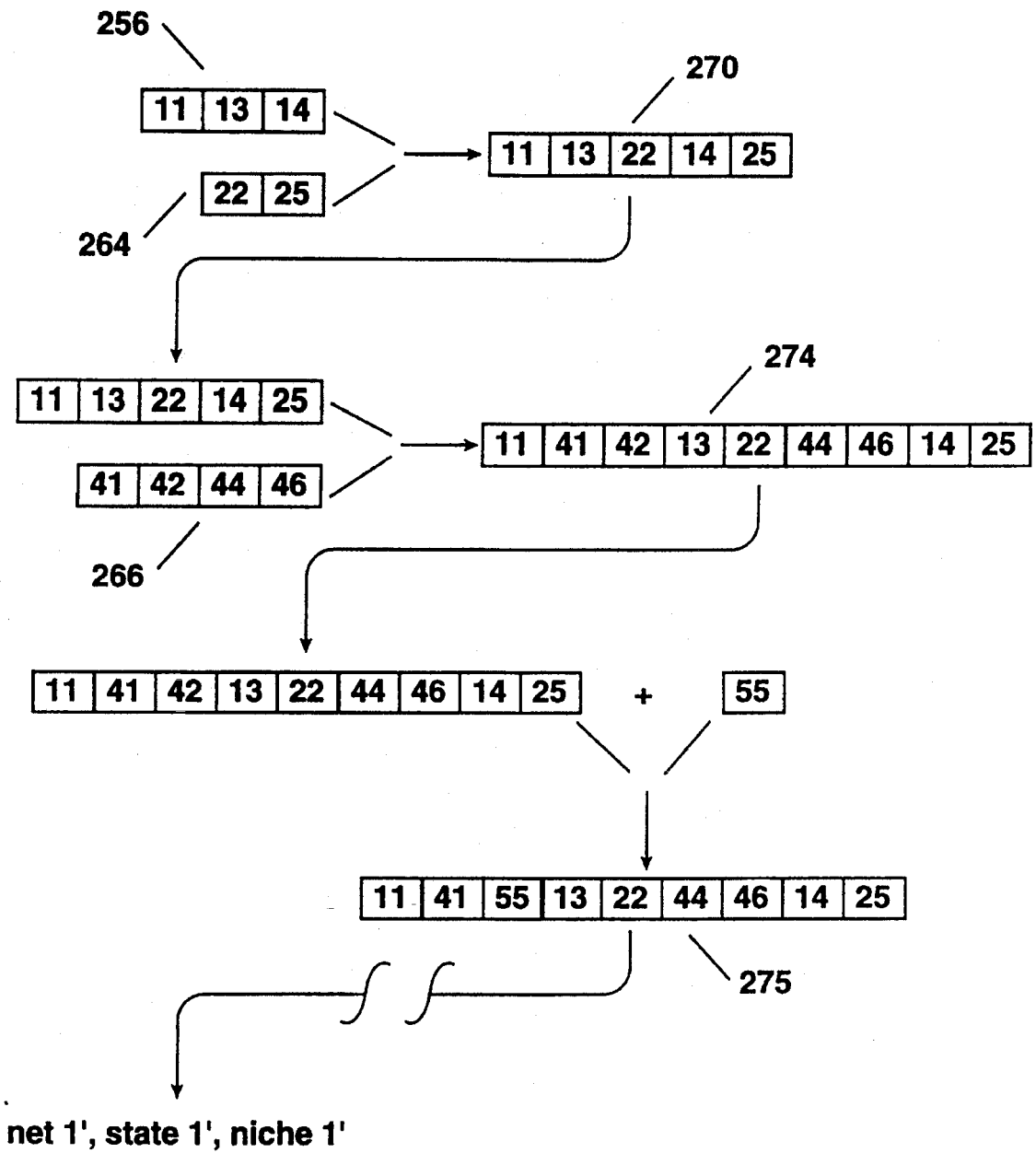
FIG. 13b is a block diagram illustrating the genetic operations of cross-over and mutation as applied to the rule files of this invention.
Figure 14:
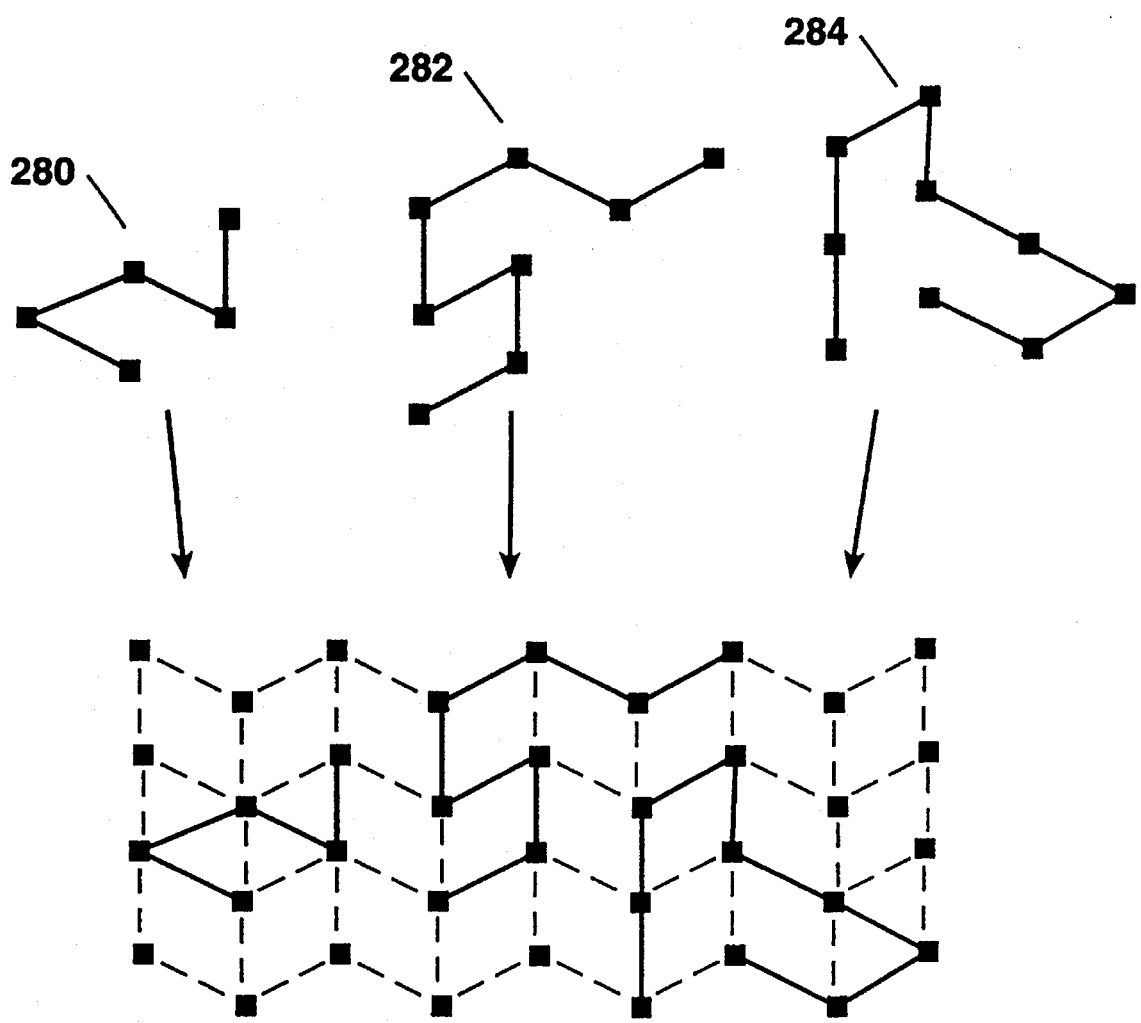
FIG. 14 is a schematic illustration of the process by which clusters of sites are added to a second generation network.

FIGS. 13a, 13b, and 14 schematically depict the steps associated with the genetic operations conducted by a genetic operator in the system. In FIG. 13a, two templates, template (1) and template (2), are used to generate two corresponding rule files 256 and 264. Each template has an associated niche file and state file. As shown, these niche and state files are used by the system to generate multiple networks. As explained above, each state file contains a list of local states available for the sites on the network. These local states are randomly selected and applied to the individual sites of each network. Further, the connections between the sites of network are given random weightings. Thus, for a single state file (associated with a single template) many very different networks can be generated. In the example shown, template 1 produces a collection of net files 250 including net 11, net 12, net 13, and net 14. Template 2 produces a different collection of net files 260 including, net 21, net 22, net 23, net 24, and net 25. Each net file is fed to the generator which produces a corresponding diagnostic instruction file. This process is somewhat random as the instructions chosen at each network site and the paths between the sites can vary. When a diagnostic file uncovers a bug, a bug file is created for the corresponding network. As shown in FIG. 13a, template 1 produces a collection of bug files 254 and template 2 produces a collection of bug files 262. In template 1, net 11, net 13, and net 14 each produced diagnostic files which uncovered bugs. Thus, each of these nets has it own bug file. However, net 12 uncovered no bug, and therefore has no corresponding bug file. In template 2, only net 22 and net 25 uncovered bugs.

Each bug file for a given template is used to identify a cluster of points within its corresponding network. Those clusters are then sequentially added to the rule file for the template. For template 1, rule file 256 includes clusters 11, 13, and 14. For template 2, rule file 264 includes clusters 22 and 25. A cluster is simply the collection of network sites corresponding to the diagnostic instructions that were in the processor pipeline when the bug was found. This information can be obtained directly from the bug file which contains the bug site as well as the number of instructions on either side of that site that were in the pipeline when the bug was found. Thus, the bug file contains sufficient information to identify all the sites on the network path segment corresponding to the bug instructions. Three clusters of points represented by reference numbers 280, 282, and 284 and shown in FIG. 14. The rule files specify each cluster's arrangement of sites and associated local states. The rule files do not, however, provide connection weightings for the clusters.

FIG. 13b illustrates the process by which rule files are combined by genetic operations. In an initial step, rule files 256 and 264 are combined by the genetic operation cross-over. In cross-over, one sequence is separated at point between adjacent clusters, and a different sequence is inserted at that site. In this example, rule file 256 is separated between clusters 13 and 14 and rule file 264 is separated between clusters 22 and 25. The separated rule files are then combined to form sequence 270 as shown. This sequence may then be combined with a rule file 266 from yet a different template. As shown, a cross-over operation produces sequence 274.

In a subsequent step, sequence 274 undergoes mutation. Generally, mutation involves replacing one cluster from a sequence with a different cluster that has been deemed particularly interesting. In this case, cluster 55 replaces cluster 42 in sequence 274 to produce mutated sequence 275. These genetic operations are repeated with rule files from different templates until the resulting sequence is large enough to fill a new network. In this example, the genetic operations ultimately lead to net 1', state 1', and niche 1' (which are used in the next generation).

For each genetic operation, there are two state files and two niche files (associated with the two parent net files) which must be combined. Thus, for example, in FIG. 13b, the state files and niche files from templates 1 and 2 must be combined. The niche file resulting from this genetic combination is randomly selected from the two parent niche files. The state file resulting from the genetic combination is likewise chosen from the two patent state files. However, the new state file may include elements from both of the parent state files. For example, the new state file may contain an offset histogram from template 1 and a loop control setting from template 2. This generally is a straight forward process.

However, it is possible that some combinations of global states can produce invalid results. Thus, it is generally necessary to test each new net file and state file with an architectural model.

FIG. 14 illustrates the process by which a network "coverage operator" builds a new network from clusters in a sequence (e.g., sequence 275 of FIG. 13b). Initially, the first cluster in the sequence is added to a virgin lattice containing only a collection of sites (e.g., a 7×7×7 network). As illustrated in FIG. 14, first cluster 280 is added to left side of virgin network 290. Next, a second cluster 282 is added to the network. After that, a third cluster 284 is added to the network, and so on. Eventually, a significant fraction of the sites in the network are filled with clusters. The manner in which these various odd shaped clusters are added to a virgin network may involve any of a number of conventional coverage algorithms (e.g., a spanning tree algorithm).

After the clusters are added to the virgin network, the connections between sites are set. Generally, the connections between sites in the individual clusters are given greater weightings than other connections in the resulting network. Typically, the weightings of intracluster connections will be about 10%. Thus, it is more likely that diagnostic files generated from the resulting network will include some paths corresponding at least parts of the clusters. The local states associated with sites from clusters are maintained from the previous generation.

Although the foregoing invention has been described in some detail for purposes of clarity of understanding, it will be apparent that certain changes and modifications may be practiced within the scope of the appended claims. For instance, although the specification has described a system employing templates which generate net, state, and niche files which are used by a generator to produce a diagnostic file, other arrangements can be used as well. For example, systems in which global states are automatically assigned by the system (rather than through a template and state file) may also be used. In addition, the reader will understand that validation of general instructions can be provided by the generator itself (rather than the architectural model). Still further, to the extent that the system of this invention is used to test microprocessor chips, those chips can have a variety of architectures and be provided by a variety of vendors. For example, the system can generate test instructions for reduced instruction set (RISC) chips, complex instruction set (CISC) chips, etc.

What is claimed is:

1. A method for generating a sequence of instructions for design verification of a processor, the method comprising the following steps:

(a) receiving a network having a plurality of sites and various paths connecting each site to a plurality of associated destination sites, each site having a plurality of associated processor instructions, and each path available to a given site having an associated weighting;

(b) designating an initial site within the network as a current site;

(c) selecting one available instruction from the current site and inserting that instruction sequentially in a diagnostic file;

(d) selecting one of the paths connected to the current site and designating the destination on that path as the current site; and (e) repeating Steps b thru d until a predetermined number of instructions have been inserted in the diagnostic file.

2. The method of claim 1 wherein the step of selecting one instruction includes a step of randomly selecting an available instruction in the current site.

3. The method of claim 1 wherein the step of selecting a path is performed by selecting an available path based upon the weighting associated with each path available to the current site.

4. The method of claim 1 further comprising a step of introducing one or more control functions in the sequence of instructions, the control functions selected from the group consisting of branch offsets, pipeline bypass control, loop control, and processor cache control.

5. The method of claim 1 further comprising the following steps:

running the diagnostic file on an architectural model providing a functional representation of the processor;

running the diagnostic file on a processor design model providing a structural representation of the processor; and comparing results of the runs on the architectural and processor design models, wherein a discrepancy in the results indicates the presence of a bug in the processor design.

6. The method of claim 1 further comprising a step of selecting one or parameters associated with certain instructions associated with the network sites.

7. A method of detecting bugs in a processor design, the method comprising the following steps:

(a) preparing a first generation of networks, each having a plurality of sites and various connections connecting each site to a plurality of associated destination sites, each site having a plurality of associated processor instructions, and each connection available to a given site having an associated weighting;

(b) for each network, traversing a network path between the sites by repeatedly selecting a current site, selecting one available instruction from the current site, inserting that instruction sequentially in a diagnostic file, selecting one of the paths connected to the current site and designating the destination on that path as the current site;

(c) performing step b until predetermined numbers of instructions have been inserted in the diagnostic files of each network;

(d) running the diagnostic file on a processor or processor design and noting any sequences of instructions which uncover bugs in the processor design; and (e) preparing a new generation of networks which contain the network sites corresponding to the sequences of instructions which uncovered bugs in the processor design.

8. The method of claim 7 wherein the step of preparing a new generation of networks includes a step of reinforcing the connection's network sites leading to sequences of instructions which uncover bugs.

9. The method of claim 7 wherein the step of preparing a new generation of networks includes a step of identifying clusters of sites which correspond to sequences of instructions which uncover bugs.

10. The method of claim 9 further comprising a step of adding the clusters to one or more new networks which are used in the new generation of networks.

11. The method of claim 9 further comprising the steps of:

arranging representations of the clusters in a plurality of sequences;

mixing the plurality of sequences by one or more genetic operations to provide genetically modified sequences; and filling the new generation of networks with clusters in an order provided by the genetically modified sequences.

12. The method claim 11 wherein the step of mixing the plurality of sequences includes mixing by one or more genetic operations selected from the group consisting of reproduction, cross-over, and mutation.

13. A system for generating a sequence of machine instruction for testing a processor of the type having a pipeline for processing a sequence of instructions, the system comprising:

a compiler residing in a computer system and executed by said computer system to prepare a network of sites each having a local state corresponding to one or more specified machine instructions and each interconnected to other sites by connections; and a generator implemented in said computer system to produce a diagnostic file containing the sequence of processor machine instructions by moving from site-to-site via the connections on the network and at each site randomly selecting one of the instructions associated with that site's local state.

14. The system of claim 13 further comprising:

an architectural model for running the sequence of machine instructions and providing the functional capabilities of the processor;

a processor design for running the sequence of machine instructions and providing the logical structure of the processor; and a comparator for comparing results generated when the architectural model and processor design run the sequence of machine instructions, such that a bug in the processor is found when the results do not agree.

15. The system of claim 14 wherein each site contains multiple connections with other sites and the connections each have a weighting reflecting the probability that the connection will be selected by the generator when moving from site-to-site.

16. The system of claim 15 further comprising means for increasing the relative weightings of connections between those sites corresponding to a sequence of instructions which uncovers a bug in the processor, such that a new network is produced which is used by the generator to produce a second sequence of machine instructions.

17. The system of claim 14 further comprising:

(a) means for retrieving a cluster of sites from a network which produced a sequence of machine instructions which uncovered a bug;

(b) a genetic operator for combining clusters from multiple networks as specified in step (a) to form a sequence of clusters; and (c) a coverage operator for producing a new network from the clusters of sites contained in the sequence of clusters.

18. The system of claim 17 wherein the genetic operator combines state files to produce a new generation state file to be used with the new network by the generator to produce a new sequence of machine instructions.

19. The system of claim 13 wherein the compiler generates a network file containing an arrangement of sites within the network from a template written in a computer language.

20. The system of claim 19 wherein the compiler also converts the template into a state file containing global states which apply to each site and which limit fields associated with the machine instructions.

21. The system of claim 13 wherein each local state contains machine instructions that are functionally related to one another and the machine instructions in each local state are mutually exclusive.

* * * * *

UNITED STATES PATENT AND TRADEMARK OFFICE
CERTIFICATE OF CORRECTION

PATENT NO. : 5,455,938
DATED : October 3, 1995
INVENTOR(S) : Sultan Ahmed

It is certified that error appears in the above-indentified patent and that said Letters Patent is hereby corrected as shown below:

Column 15, line 66, change "Steps" replace with -- steps --.
Column 17, line 10, change "instruction" replace with -- instructions -- .

Signed and Sealed this

Fifth Day of November, 1996

Attest:

BRUCE LEHMAN

Attesting Officer

Commissioner of Patents and Trademarks